United States Patent Office 2,801,251
Patented July 30, 1957

2,801,251

DERIVATIVES OF TESTOLOLACTONE

Richard W. Thoma, Somerville, and Josef Fried, New Brunswick, N. J., assignors to Olin Mathieson Chemical Corporation, New York, N. Y., a corporation of Virginia No Drawing. Application January 6, 1956,
Serial No. 557,644

4 Claims. (Cl. 260—343.2)

This invention relates to, and has for its object, the provision of steroids of the general formula

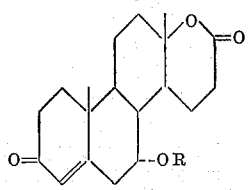

wherein R is a hydrogen or acyl. These compounds are pharmacologically-active steroids, useful as protein-anabolic agents. Hence the new steroids of this invention can be used in lieu of known protein-anabolic steroids, and may be administered either perorally or parenterally in the treatment of post-operative shock and other conditions where tissue degeneration has occurred, being formulated for such administration in the same type of preparations as testosterone, for example, with concentration and/or dosage based on the activity of the particular compound.

It has further been found that one of the steroids of this invention, namely, 7 α-hydroxytestololactone (R is hydrogen) can be prepared from testololactone by subjecting the latter to the action of enzymes of *Coniothyrium helleborine*, or to the action of the organism itself under oxidizing and preferably aerobic conditions; and further, that this new steroid can either be dehydrated to another of the steroids of this invention, namely, 6-dehydrotestololactone, or esterified to yield the 7 α-acyloxy derivatives.

Among the steroids formed by the process of this invention are 7α-hydroxytestololactone, 6-dehydrotestololactone, a steroid useful as an anabolic agent, and esters of 7 α-hydroxytestololactone. Although all ester derivatives have the protein-anabolic activity of the free 7 α-hydroxytestololactone, the preferred esters are those formed from organic carboxylic acids, especially from organic hydrocarbon carboxylic acids having less than ten carbon atoms, as exemplified by the lower alkanoic acids (e. g. acetic, propionic and butyric acid), the monocyclic aromatic carboxylic acids (e. g. benzoic, toluic, and xyloic acid), and the monocyclic aralkanoic acid (e. g. α-toluic and phenylacetic acid).

To prepare the steroids of this invention, testololactone is subjected to the action of enzymes of the microorganism *Coniothyrium helleborine* under oxidizing conditions. This oxidation can best be effected by either including testololactone in an aerobic culture of the microorganism, or by bringing together, in an aqueous medium, the steroid, air, and enzymes of non-proliferating cells of the microorganism.

In general, the conditions of culturing *Coniothyrium helleborine* for the purposes of this invention are (except for the inclusion of the testololactone to be converted) the same as those of culturing various other molds for the production of antibiotics and/or vitamin B-12, i. e., the microorganism is aerobically grown in contact with (in or on) a suitable fermentation medium. A suitable medium essentially comprises a source of carbon and energy. The latter may be a carbohydrate (such as sucrose, molasses, glucose, maltose, starch, or dextrin), a fatty acid, a fat and/or the steroid itself. Preferably, however, the medium includes an assimilable source of carbon and energy in addition to the steroid. Among the fats utilizable for the purpose of this invention are: lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein, and trilaurin. Among the fatty acids utilizable for the purpose of this invention are: stearic acid, palmitic acid, oleic acid, linoleic acid, and myristic acid.

The source of nitrogenous factors may be organic (e. g. soybean meal, corn steep liquor, meat extract and/or distillers' solubles) or synthetic (i. e. composed of simple, synthesizable organic or inorganic compounds such as ammonium salts, alkali nitrates, amino acids or urea).

An adequate sterile-air supply should be maintained during fermentation, for example by the conventional methods of exposing a large surface of the medium to air or by utilizing submerged aerated culture. The steroid may be added to the culture during the incubation period, or included in the medium prior to sterilization or inoculation. The preferred (but not limiting) range of concentration of the steroid in the culture is about 0.01 to 0.10%. The culture period (or rather the time of subjecting the streoid to the action of the enzyme) may vary considerably, the range of about 6 to 96 hours being feasible, but not limiting.

The process yields, inter alia, 7α-hydroxytestololactone, which may be separated from the broth by extraction and from other concomitantly produced steroids by fractional crystallization. 7α-hydroxytestololactone can, if desired, either be esterified in the usual manner, as by treatment with the desired acid anhydride or acyl halide in an organic solvent (preferably an organic base such as pyridine) to yield 7α-acyloxytestololactone, or dehydrated in the usual manner, as by treatment with a base (e. g. methanolic potassium hydroxide) to give 6-dehydrotestololactone.

The following examples are illustrative of the invention:

EXAMPLE 1

*7α-hydroxytestololactone*

(a) FERMENTATION

A fermentation medium of the following composition is prepared:

| | Grams |
|---|---|
| Cerelose | 44 |
| Starch | 20 |
| Peptone liquor | 20 |
| Malted cereal extract syrup | 10 |
| NaNO₃ | 3 |
| KH₂PO₄ | 1 |
| KCl | 0.5 |
| MgSO₄.7H₂O | 0.5 |
| FeSO₄ | 0.01 |

Water to make one liter.

The pH of the medium is adjusted to 7.0±0.1 with 2 N NaOH solution, and 50 ml. portions of the medium are distributed in 250 ml. Erlenmeyer flasks, the flasks plugged with cotton and sterilized by autoclaving for 30 minutes at 120° C. When cool, each of the flasks is inoculated with 2.5 ml. of a suspension prepared by using 150 ml. of water (with 0.01% Duponal as wetting agent) to suspend the sporulated growth of a 15 day old cracked corn (15 g. of cracked corn; 20 ml. of distilled water) culture of *Coniothyrium helleborine* or derived strains;

the parent organism is obtainable, inter alia, from the Kansas State College Department of Botany.

The flasks are then mechanically shaken for 69 hours at 25° C. on a 280 cycle per minute rotary shaker, after which about 6% (v./v.) is transferred to each of 24 flasks containing 50 ml. of the following medium:

| | Grams |
|---|---|
| Glucose | 40 |
| NaNO$_3$ | 3 |
| KH$_2$PO$_4$ | 1 |
| KCl | 0.5 |
| MgSO$_4$.7H$_2$O | 0.5 |
| FeSO$_4$.7H$_2$O | 0.02 |
| Water to make one liter. | |

After 24 hours incubation, a total of 300 mg. of testololactone is added in 12 ml. of absolute methanol (0.5 ml. per flask). The flasks are then incubated an additional 48 hours, after which the flasks are harvested and the contents filtered through cheesecloth and washed with 250 ml. of water. The total volume of filtrate and wash is 1280 ml.

(b) ISOLATION OF 7α-HYDROXYTESTOLOLACTONE

The thus-obtained culture filtrate is extracted with three 800 ml. portions of chloroform and the chloroform solution evaporated to dryness in vacuo. The residue from the choloroform solution (about 305 mg.) is separated into the two components 6β-hydroxytestololactone and 7α-hydroxytestololactone by fractional crystallization from methanol.

The more insoluble 7α-hydroxytestololactone amounts to about 93 mg. and has the following properties: M. P. about 275–280° C.; $[\alpha]_D^{23}+27°$ (c, 0.54 in chloroform); $\lambda_{max}^{alc}$ 239 mµ (ε=16,900); $\lambda_{max}^{Nujol}$ 2.93 µ (OH); 5.87–3.90 µ (lactone carbonyl); 6.01 µ, 6.19 µ ($\Delta^4$-3-ketone).

Analysis.—Caluclated for C$_{19}$H$_{26}$O$_4$ (318.40): C, 71.67; H, 8.23. Found: C, 71.77; H, 7.98.

7α-hydroxytestololactone can be esterified as illustrated in the following example:

EXAMPLE 2

7α-hydroxytestololactone 7α-acetate

A solution of 22.3 mg. of 7α-hydroxytestololactone in 0.5 ml. of acetic anhydride and 0.5 ml. of pyridine is allowed to stand at room temperature for 48 hours. After removal of the reagents in high vacuum, the residue is crystallized from acetone. This affords about 6.4 mg. of unchanged starting material, M. P. about 279–281° C. Crystillization of the mother liquors from acetone-hexane yields the pure acetate (about 11.6 mg.) having the following properties: M. P. about 227–28° C.; $[\alpha]_D^{23}-48°$ (c, 0.55 in chloroform); $\lambda_{max}^{alc}$ 236 mµ (ε=17,300); $\lambda_{max}^{Nujol}$ 5.75 µ (acetyl carbonyl); 5.80 µ (lactone carbonyl), 6.01 µ, 6.17 µ ($\Delta^4$-3-ketone).

Analysis.—Calculated for C$_{21}$H$_{28}$O$_5$(360.44): C, 69.97; H, 7.83. Found: C, 69.92; H, 7.70.

Similarly by substituting other acid anhydrides, such as propionic anhydride, or acyl halides, such as benzoyl chloride, for the acetic anhydride in the procedure of Example 2, the corresponding ester derivatives are produced.

7α-hydroxytestololactone can be dehydrated as illustrated by the following example:

EXAMPLE 3

6-dehydrotestololactone

A solution of 200 mg. of 7α-hydroxytestololactone in 5 ml. of 2% methanolic potassium hydroxide is allowed to stand at room temperature for 20 hours. During this period of time the ultraviolet maximum at 239 mµ gradually decreases and gives way to a maximum at 284 mµ characteristic of the $\Delta^{4,6}$-3-ketone grouping. The solution is neutralized with dilute acetic acid, water is added and the methanol is evaporated in vacuo. The resulting suspension is extracted with chloroform, the chloroform removed in vacuo and the resulting residue crystallized from acetone-hexane to give pure 6-dehydrotestololactone.

The invention may be variously otherwise embodied within the scope of the appended claims.

We claim:

1. A steroid of the general formula

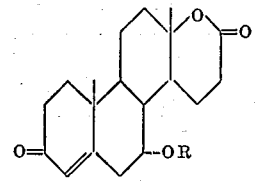

wherein R is selected from the group consisting of hydrogen and acyl, wherein the acyl radical is of an unsubstituted organic hydrocarbon carboxylic acid of less than ten carbon atoms selected from the group consisting of alkanoic acids, monocyclic aryl carboxylic acids and monocyclic aralkanoic acids.

2. 7α-hydroxytestololactone.
3. 7α-hydroxytestololactone 7α-acetate.
4. 6-dehydrotestololactone.

References Cited in the file of this patent

UNITED STATES PATENTS

| 2,499,247 | Jacobsen et al. | Feb. 28, 1950 |
| 2,744,120 | Fried et al. | May 1, 1956 |
| 2,755,289 | Picha | July 17, 1956 |